(12) United States Patent
Zhou et al.

(10) Patent No.: US 12,130,209 B2
(45) Date of Patent: Oct. 29, 2024

(54) SYSTEM AND METHOD FOR TESTING STRUCTURE MODE OF VIBRATION BASED ON DIGITAL IMAGE RECOGNITION

(71) Applicant: CHANG'AN UNIVERSITY, Xi'an (CN)

(72) Inventors: Yongjun Zhou, Xi'an (CN); Yu Zhao, Xi'an (CN); Yelu Wang, Xi'an (CN); Yi Han, Xi'an (CN); Yuan Jing, Xi'an (CN); Yuxin Xue, Xi'an (CN); Ranran Li, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 435 days.

(21) Appl. No.: 17/524,750

(22) Filed: Nov. 12, 2021

(65) Prior Publication Data
US 2022/0074808 A1 Mar. 10, 2022

Related U.S. Application Data

(63) Continuation of application No. PCT/CN2020/124972, filed on Oct. 29, 2020.

(30) Foreign Application Priority Data

May 28, 2020 (CN) .......................... 202010470955.9

(51) Int. Cl.
*G01M 11/08* (2006.01)
*G01H 9/00* (2006.01)
(Continued)

(52) U.S. Cl.
CPC ............ *G01M 5/0066* (2013.01); *G01H 9/00* (2013.01); *G01H 9/002* (2013.01);
(Continued)

(58) Field of Classification Search
CPC ............ G01M 5/0008; G01M 5/0066; G01M 11/081; G01M 7/025; G01H 9/00; G01H 9/002
See application file for complete search history.

(56) References Cited

U.S. PATENT DOCUMENTS

| | | |
|---|---|---|
| 2015/0109407 A1 | 4/2015 | Giger |
| 2019/0041258 A1 | 2/2019 | Bahadirlar et al. |
| 2022/0383478 A1* | 12/2022 | Catbas ...................... G06T 7/74 |

FOREIGN PATENT DOCUMENTS

| | | |
|---|---|---|
| CN | 201364143 Y | 12/2009 |
| CN | 101630107 A | 1/2010 |

(Continued)

OTHER PUBLICATIONS

Aliansyah Z, Shimasaki K, Senoo T, Ishii I, Umemoto S. Single-Camera-Based Bridge Structural Displacement Measurement with Traffic Counting. Sensors (Basel). Jul. 1, 2021;21(13):4517. doi: 10.3390/s21134517. PMID: 34282780; PMCID: PMC8271680. (Year: 2021).*

(Continued)

*Primary Examiner* — Jennifer Bahls
(74) *Attorney, Agent, or Firm* — W&G Law Group

(57) ABSTRACT

Disclosed is a system and method for testing a structure mode of vibration based on digital image recognition, which comprises a camera, targets, a bridge, a vertical acceleration sensor and a lateral acceleration sensor; the camera is arranged near the bridge head of the bridge; the bridge is equipped with a plurality of targets equidistantly inside guardrails on both sides; and the vertical acceleration sensor and the lateral acceleration sensor are fixedly arranged on the camera. The present application avoids the arrangement of a large number of sensors and complicated wiring in the bridge vibration detection, saves time and reduces economic (Continued)

cost, is convenient to operate, has relatively high precision, and has broad application prospects.

5 Claims, 10 Drawing Sheets

(51) Int. Cl.
 *G01M 5/00* (2006.01)
 *G01M 7/02* (2006.01)
(52) U.S. Cl.
 CPC .......... *G01M 5/0008* (2013.01); *G01M 7/025* (2013.01); *G01M 11/081* (2013.01)

(56) References Cited

FOREIGN PATENT DOCUMENTS

| | | | |
|---|---|---|---|
| CN | 102175261 A | 9/2011 | |
| CN | 103575227 A | 2/2014 | |
| CN | 103940358 A | 7/2014 | |
| CN | 104469357 A | 3/2015 | |
| CN | 104614064 A | 5/2015 | |
| CN | 104679483 A | 6/2015 | |
| CN | 104764622 A | 7/2015 | |
| CN | 105067208 A | 11/2015 | |
| CN | 105067245 A | 11/2015 | |
| CN | 105100614 A | 11/2015 | |
| CN | 106225708 A | 12/2016 | |
| CN | 108318129 A | 7/2018 | |
| CN | 109186902 A | 1/2019 | |
| CN | 109341549 A | 2/2019 | |
| CN | 208537960 U | 2/2019 | |
| CN | 109443529 A | 3/2019 | |
| CN | 109737883 A * | 5/2019 | |
| CN | 110031084 A | 7/2019 | |
| CN | 110243465 A | 9/2019 | |
| CN | 111076880 A | 4/2020 | |
| CN | 111649816 A | 9/2020 | |
| CN | 112378507 A * | 2/2021 | ............ G01B 11/02 |
| JP | 2008224353 A | 9/2008 | |
| JP | 2010136269 A * | 6/2010 | |
| TW | 201636904 A | 10/2016 | |
| WO | 2019097579 A1 | 5/2019 | |

OTHER PUBLICATIONS

International Search Report (PCT/CN2020/124972); Date of Mailing: Mar. 9, 2021.
CN First Office Action(202010470955.9); Date of Mailing: Mar. 1, 2021.
CN Second Office Action(202010470955.9); Date of Mailing: Aug. 18, 2021.
Design of a wireless vibration metre for conductor vibration monitoring; Date of Mailing: Mar. 31, 2018.
Study on Application of Digital Image Processing Technique in the Vibration Testing of Beam and Cable Structure; Date of Mailing: Feb. 1, 2011.
Study on design parameters affecting the seismic response of curved continuous rigid frame bridges with long-span and high-pier; Date of Mailing: Dec. 15, 2006.
A Comparative Study on Radar Interferometry for Vibrations Monitoring on Different Types of Bridges; Date of Mailing: Mar. 28, 2018.

* cited by examiner

SYSTEM AND METHOD FOR TESTING STRUCTURE MODE OF VIBRATION BASED ON DIGITAL IMAGE RECOGNITION

CROSS-REFERENCE TO RELATED APPLICATIONS

The present application is a continuation of International Application No. PCT/CN2020/124972, filed on Oct. 29, 2020, which claims priority to Chinese Application No. 2020104709559, filed on May 28, 2020, the contents of both of which are incorporated herein by reference in their entireties.

TECHNICAL FIELD

The present application belongs to the field of bridge engineering, and relates to a system and method for testing a structure mode of vibration based on digital image recognition.

BACKGROUND

The bridge structure vibration testing and its modal parameter identification are very important for safety assessment and health monitoring of the bridge structure. After the bridge is excited by wind load, water flow, vehicle load or even earthquakes, the components with similar natural frequencies will be amplified. The random vibration test of a real bridge environment uses this principle to obtain the modal parameters of the bridge structure by detecting and analyzing the vibration displacements of the bridge at different measuring points. With the growth of modern bridge spans, for full-scale bridge testing, the random excitation method has become the only possible method.

The random excitation method traditionally uses contact measurement. In order to fully grasp the characteristics of bridge vibration, it is necessary to arrange sensors in multiple parts of the bridge structure, which is high in cost, long in cycle, and heavy in data acquisition and analysis workload, and the problems of synchronization and installation consistency between the sensors need to be solved, so that the contact measurement is subject to certain restrictions. Therefore, it is urgent to explore and develop a novel non-contact system and method for detecting the real bridge vibration, which is high in precision, low in cost, and easy to operate, and has wide applicability and no damage to the bridge.

SUMMARY

In order to overcome the shortcomings of the existing contact measurement in the bridge vibration testing, the present application provides a system and method for testing a structure mode of vibration based on digital image recognition, which avoids the arrangement of a large number of sensors and complicated wiring in the bridge vibration detection, saves time and reduces economic cost, is convenient to operate, has relatively high precision, and has broad application prospects.

A system for testing a structure mode of vibration based on digital image recognition includes a camera, targets, a bridge, a vertical acceleration sensor and a lateral acceleration sensor; the camera is arranged near the bridge head of the bridge; the bridge is equipped with a plurality of targets equidistantly inside guardrails on both sides; and the vertical acceleration sensor and the lateral acceleration sensor are fixedly arranged on the camera.

A method for testing a structure mode of vibration based on digital image recognition is performed by adopting the above-mentioned system for testing the structure mode of vibration based on digital image recognition according to the present invention, and includes the following process that:

the camera captures images containing all targets in real time, and the vertical acceleration sensor and the lateral acceleration sensor monitor the vibration of the camera itself in real time; and when the bridge is subjected to random excitation to produce vibration, the targets and the camera vibrate together with the bridge, and the lateral vibration curve, longitudinal vibration curve and torsional vibration curve of the bridge are calculated by the images containing the targets and the camera vibration information to realize the testing of bridge vibration.

Preferably, the process of calculating the lateral vibration curve, longitudinal vibration curve and torsional vibration curve of the bridge by the images containing the targets and the camera vibration information includes:

capturing the center of each target from the images containing the targets, obtaining the pixel displacements of the target center at different moments, and converting into a unit of length, and then obtaining the lateral relative vibration displacements and longitudinal relative vibration displacements of the measuring points where the targets are located;

unifying the units of the lateral relative vibration displacement and longitudinal relative vibration displacement of each target and the units of the lateral relative vibration displacement and longitudinal vibration displacement unit of the camera, and subtracting the reverse displacement caused by camera vibration from the relative vibration displacement of the measuring point to obtain the absolute vibration displacement of the measuring point;

drawing a lateral time history curve and a vertical time history curve of the measuring point corresponding to each target;

using the lateral time history curve and the longitudinal time history curve of the measuring point corresponding to each target to obtain the natural frequency of each order, and obtain the lateral vibration amplitude-frequency characteristics and longitudinal vibration amplitude-frequency characteristics of the bridge;

calculating the real-time torsion angle of the measuring point and drawing a time history curve through the longitudinal absolute vibration displacements of measuring points of the two lateral target in the longitudinal direction of the bridge, and obtaining the torsion amplitude-frequency characteristic curve of each measuring point by using the real-time torsion angles and time history curves of all measuring points; and using the obtained torsion amplitude-frequency characteristic curve of each measuring point to obtain the lateral vibration curve, longitudinal vibration curve and torsional vibration curve of the bridge.

The present application has the following beneficial effects:

The system for testing the structure mode of vibration based on digital image recognition according to the present application uses the camera to capture the images containing the targets, and uses the vertical acceleration sensor and the lateral acceleration sensor to monitor the vibration of the camera itself in real time. When the bridge is subjected to random excitation to produce vibration, the lateral vibration curve, the longitudinal vibration curve and the torsional vibration curve of the bridge are calculated through the images containing the targets and the camera vibration information, so as to realize the testing of the bridge vibration. The sensors used in the present application are only the vertical acceleration sensor and the lateral acceleration sensor; compared with the existing measurement system, the number of sensors required is greatly reduced, the measurement cost is reduced, and the bridge does not need to be equipped with acceleration or displacement sensors, which avoids the synchronization and installation consistency between the sensors, does not require a lot of wiring work, and has no damage to the bridge deck.

The method for testing the structure mode of vibration based on digital image recognition according to the present application uses the images containing all targets captured by the camera in real time and the vibration of the camera itself information monitored by the vertical acceleration sensor and the lateral acceleration sensor in real time to calculate the lateral vibration curve, the longitudinal vibration curve and the torsional vibration curve of the bridge when the bridge is subjected to random excitation to produce vibration so as to realize the testing of the bridge vibration. By an image acquiring method, the time synchronization is relatively good, which avoids the problems of synchronization and installation consistency between the sensors due to the large number of sensors in the prior art, and by using the arrangement form of the targets and the camera vibration information monitored by the vertical acceleration sensor and the lateral acceleration sensor according to the present application, the high-precision detection of the lateral (bridge width direction), the longitudinal (vertical to the bridge deck direction) vibration and the torsional vibration can be realized at one time, and the synergy is relatively good.

BRIEF DESCRIPTION OF DRAWINGS

FIG. 6(*b*) is a longitudinal displacement time history curve of a measuring point 3 in the embodiment of the present application;

FIG. 6(*c*) is a longitudinal displacement time history curve of a measuring point 4 in the embodiment of the present application;

FIG. 10(*b*) is a second-order mode of vibration diagram of the bridge in the embodiment of the present application;

FIG. 11(*b*) is a damping ratio diagram of the measuring point 3 in the embodiment of the present application;

FIG. 11(*c*) is a damping ratio diagram of the measuring point 4 in the embodiment of the present application;

Reference signs: 1—camera, 2—target, 3—bridge, 4—vertical acceleration sensor, 5—lateral acceleration sensor, 6—data acquisition system, 7—computer, 8—camera tripod.

DESCRIPTION OF EMBODIMENTS

Figure 1:
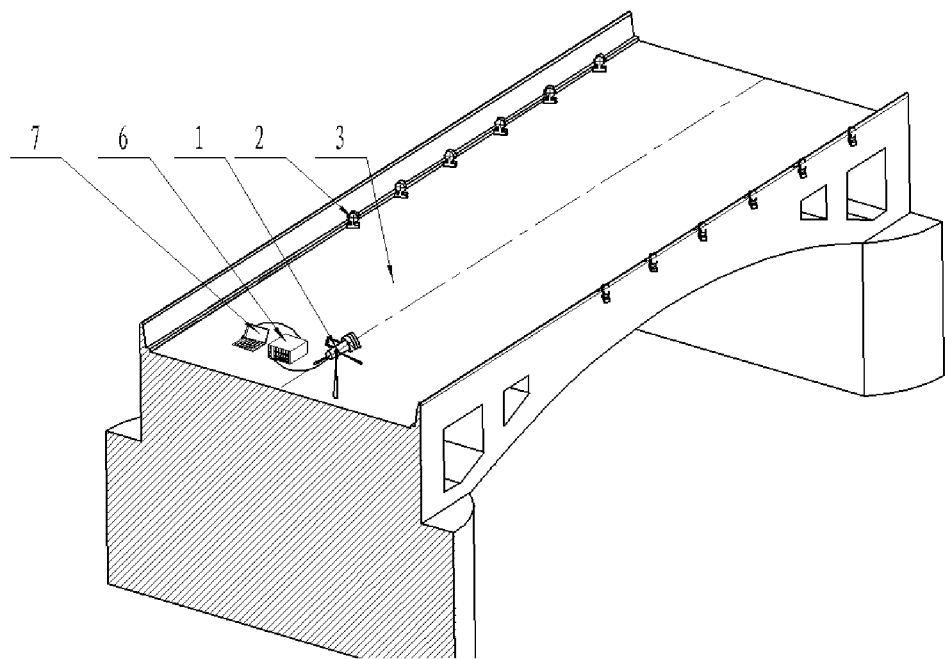
FIG. 1 is a structural schematic diagram of a system for testing a structure mode of vibration based on digital image recognition according to the present application.
Figure 2:
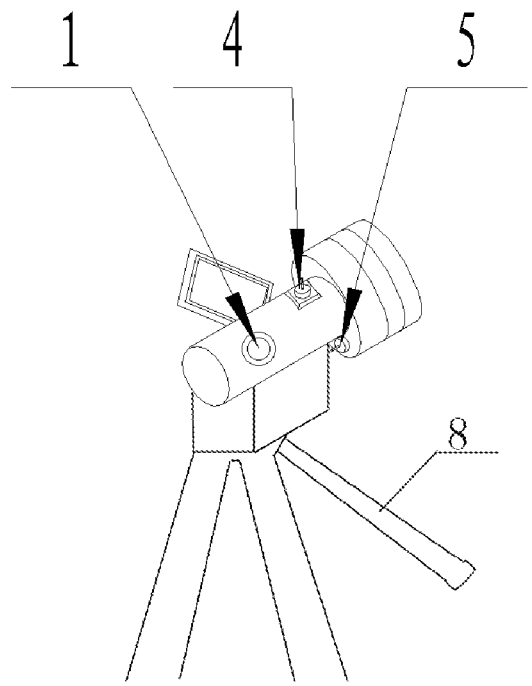
FIG. 2 is a structural schematic diagram of a camera, a vertical acceleration sensor and a lateral acceleration sensor according to the present application.
Figure 3:
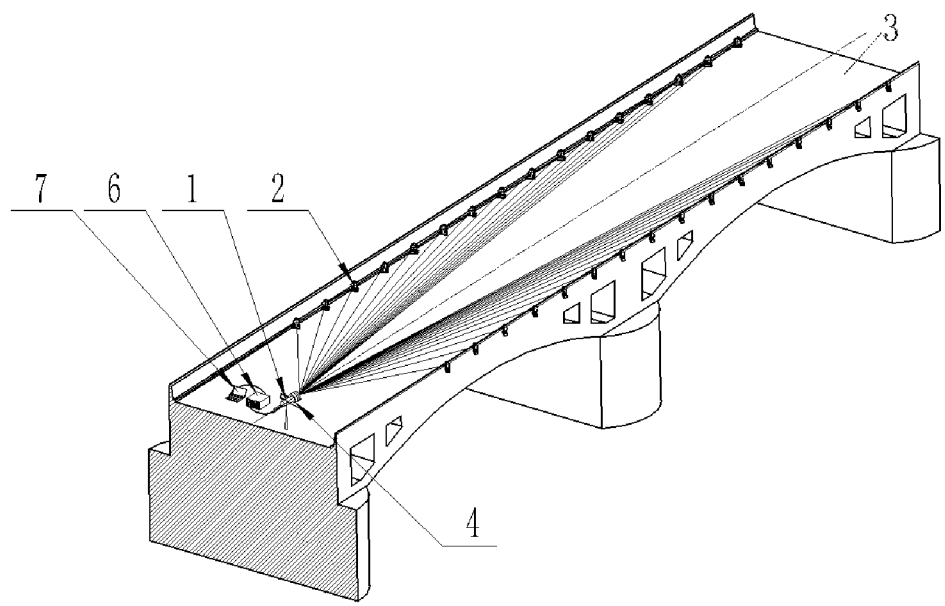
FIG. 3 is a three-dimensional diagram of the system for testing the structure mode of vibration based on digital image recognition according to the present application during image acquisition.

Hereinafter, the structure principle and analysis principle of the present application will be described in detail with reference to the accompanying drawings:

As shown in FIG. 1 and FIG. 3, a system for testing a structure mode of vibration based on digital image recognition according to the present application includes a camera 1, targets 2, a bridge 3, a vertical acceleration sensor 4, a lateral acceleration sensor 5, a data acquisition system 6, a computer 7, and a camera tripod 8; the camera 1 is arranged near the bridge head of the bridge 3, and the camera tripod 8 is located at the bottom of the camera 1, and is used for supporting the camera 1 and adjusting the position of camera 1; the bridge 3 is equipped with a plurality of targets 2 equidistantly inside the guardrails on both sides; as shown in FIG. 2, the vertical acceleration sensor 4 and the lateral acceleration sensor 5 are fixedly arranged on the camera 1 without relative displacement; and the data acquisition system 6 is connected to the camera 1, and the computer 7 is connected to the data acquisition system 6.

Wherein the camera 1 is Canon 5D SR, which requires 3 frames per second or more high-speed burst, 12 times or more magnification display, effective pixels of above 4000 W, not less than 40 cross-type AF points, a shutter speed of 1/8000 to 30 seconds, and a CMOS image sensor, and has a mirror vibration control function, and a DIGIC6 digital image processor. The target 2 is a special light circular foam target with a cross bullseye, the target thickness is 20-50 mm, the square target length and width range is 100-200 mm, the cross line width is 5-10 mm, and it is required that the line color and the background color (white) contrast obviously. The target 2 is a special light circular foam target with a cross bullseye.

The vertical acceleration sensor 4 has voltage sensitivity of 200-500 mV, an operating frequency range of 0.2-8 KHz, a maximum range of not less than 10 g, resolution of not less than 0.0004 g, an operating temperature range of −20~80° C., a dead weight of not more than 100 g, and a size of less than 50×50 mm.

The lateral acceleration sensor 5 has voltage sensitivity of 200-500 mV, an operating frequency range of 0.2-8 KHz, a maximum range of not less than 10 g, resolution of not less than 0.0004 g, an operating temperature range of −20~80° C., a dead weight of not more than 100 g, and a size of less than 50×50 mm.

The data acquisition system 6 is used for receiving the information acquired by the camera 1, the vertical acceleration sensor 4 and the lateral acceleration sensor 5, and transmitting the acquired information to the computer 7 for data processing.

The computer 7 is Lenovo ThinkPad T490, which has a CPU speed of 3.1 GHZ, memory of 8G or more, a hard disk capacity of 1 T or more, RJ45, HDMI interfaces, display resolution of 4×4096×2160/4×5120×2880@60 Hz, and video memory of above 2 GB.

The tripod 8 has an unfolded size of not more than 1000 mm, a load capacity of not less than 10 kg, and a weight of not more than 5 kg. A celestron electric head is matched with the tripod.

Figure 12:
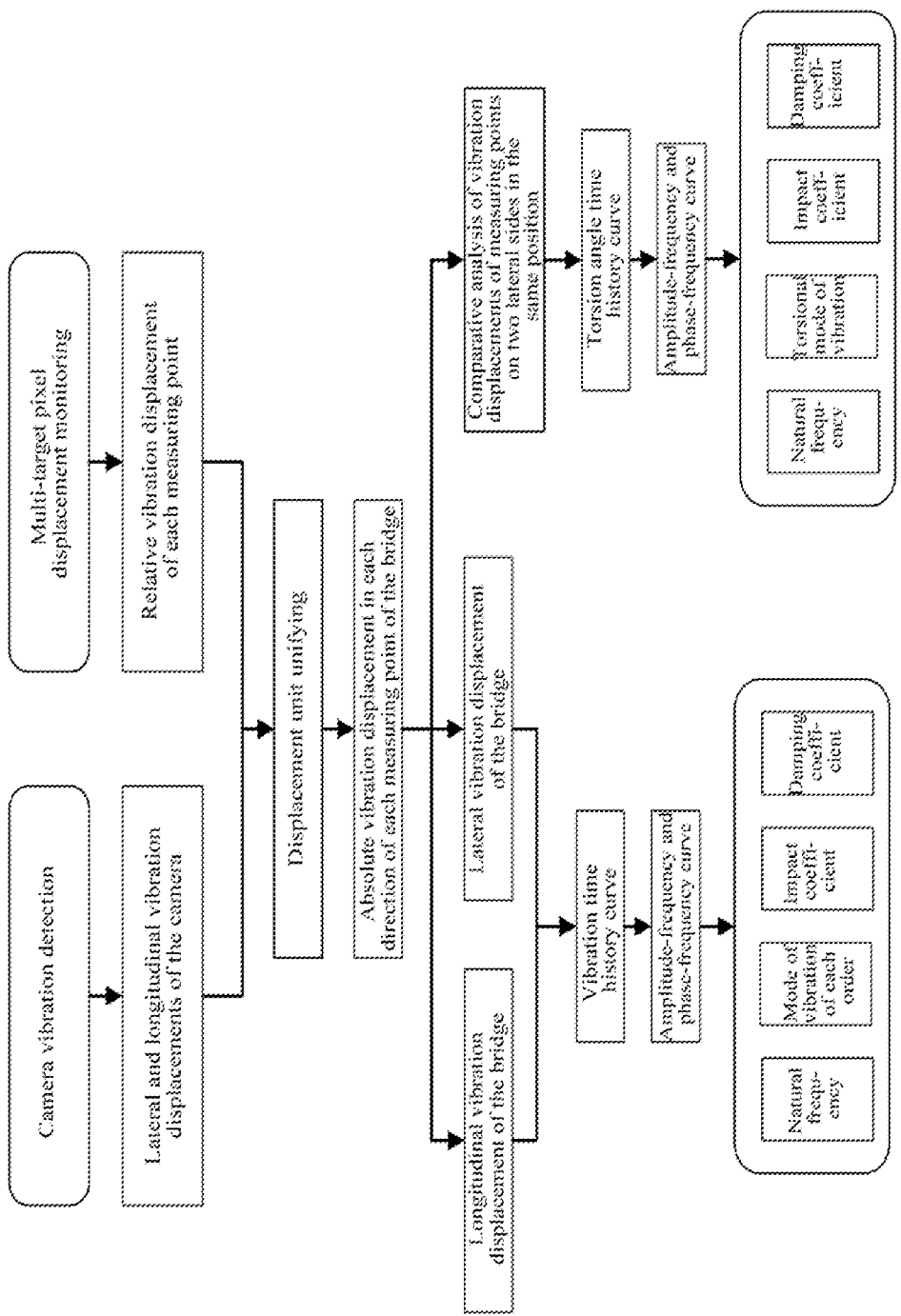
FIG. 12 is a flowchart of a method for testing a structure mode of vibration based on digital image recognition according to the present application.

With reference to FIG. 12, when the system for testing the structure mode of vibration based on digital image recognition according to the present application is in use, the bridge 3 is excited by wind load, water flow, vehicle load or even earthquakes to produce vibration, and the target 2 and the camera 1 which are arranged on the bridge 3 are also vibrated. As shown in FIG. 2, the camera 1 can simultaneously monitor the pixel displacements of the plurality of targets 2 at each measuring point by real-time imaging, obtain the vibration situation of each target 2 measuring point relative to the camera 1, and store the image in real time, and transmit through the acquisition card of the data acquisition system 6 and store in the computer 7. The vibration pixel displacement of each target 2 measuring point relative to the camera 1 is converted into the lateral and longitudinal relative vibration displacements expressed in unit of length.

Before starting the measurement, a certain number of targets 2 are arranged inside guardrails on both sides of the bridge deck. The positions of the targets 2 on both sides of the bridge deck should be aligned correspondingly in the transverse direction of the bridge, and all target planes are perpendicular to the camera's line of sight, and all targets are numbered.

The camera 1 is arranged at one end of the bridge 3, the camera is facing the center of the target 2, a vertical acceleration sensor 4 and a lateral acceleration sensor 5 are arranged on the camera, and the vertical acceleration sensor 4 and the lateral acceleration sensor 5 are used for detecting the vibration of the camera 1. The data measured by the vertical acceleration sensor 4 and the lateral acceleration sensor 5 can be used to eliminate the effect of the vibration of the camera itself on the detection result in the subsequent calculation process.

After starting the measurement, the real-time image data containing all the targets 2 monitored by the camera is transmitted through the acquisition card of the data acquisition system 6 and stored in the computer 7.

Capturing the center of each target 2 in the real-time image transmitted from the camera, the computer 7 obtains the pixel displacement of the target center at different moments, and converts it into a unit of length, and then obtains the lateral and longitudinal relative vibration displacements of the measuring points where all the targets are located.

The computer 7 unifies the units of the lateral and longitudinal relative vibration displacements of each target 2 and the units of the lateral and longitudinal vibration displacements of the camera 1 at the same time, and subtracts the lateral and longitudinal vibration displacements of the camera 1 from the lateral and longitudinal relative vibration displacements of each target 2 to obtain the lateral and longitudinal absolute vibration displacements of each target 2.

The computer 7 performs denoising preprocessing on the lateral and longitudinal absolute vibration displacement data of each target 2 by a filtering method, and draws the lateral and longitudinal time history curves of each target 2 measuring point, and performs the fast Fourier transform and spectrum analysis on the lateral and longitudinal time history curves of each target 2 measuring point to identify the natural frequency of each order, can calculate the damping coefficient based on an improved half-power spectral density method, can obtain the impact coefficient of the bridge by adopting a weighting method, and draws lateral and longitudinal mode of vibration curves of the first three orders of the bridge 3.

The fast Fourier transform and frequency spectrum analysis are performed on the lateral and longitudinal time history curves of each target measuring point to identify the natural frequency of each order, and obtain the lateral and longitudinal vibration amplitude-frequency characteristics of the bridge.

Figure 4:
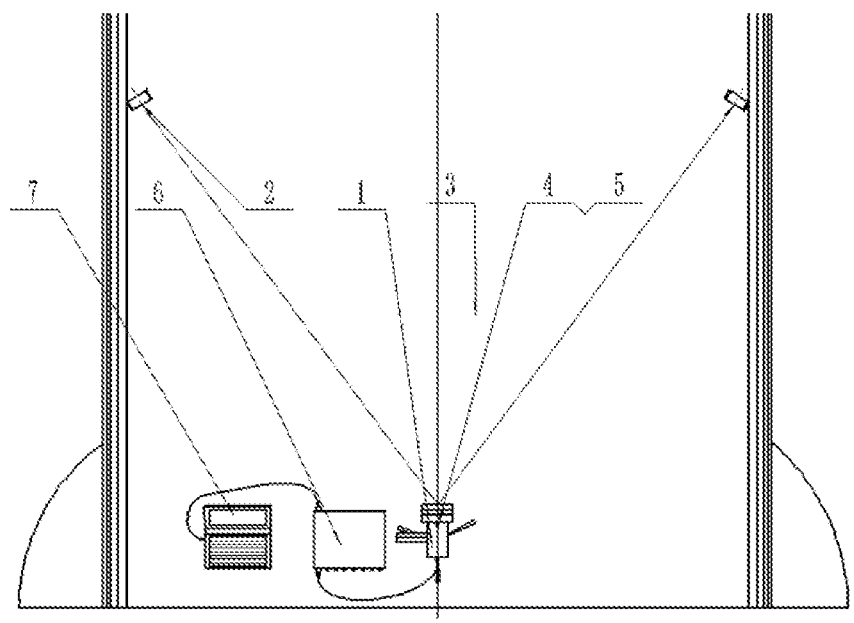
FIG. 4 is a partial top view of the system for testing the structure mode of vibration based on digital image recognition according to the present application during image acquisition.

As shown in FIG. 4, through the longitudinal absolute vibration displacements of measuring points of the two lateral targets 2 in the longitudinal direction of the bridge, the real-time torsion angle of the cross section of the bridge at these two measuring points can be calculated and the time history curve can be drawn. The fast Fourier transform and frequency spectrum analysis are performed on the abovementioned time history curves. After the above-mentioned processing is performed on the data of all target measuring points, the torsional amplitude-frequency characteristic curve of each measuring point can be obtained, that is, the torsional mode of vibration of the bridge 3.

Using the amplitude-frequency characteristic curve obtained above, the damping coefficient is calculated based on the half-power spectral density method, the impact coefficient of the bridge is obtained by the weighting method, and the lateral vibration curve, longitudinal vibration curve and torsional vibration curve of the bridge can be obtained to realize the testing of bridge vibration.

It can be seen from the above that the present application can be a real bridge vibration detection method for testing a full-scale bridge, which has small data acquisition and analysis workload, wide applicability and no damage to the bridge.

EXAMPLE

Figure 5:
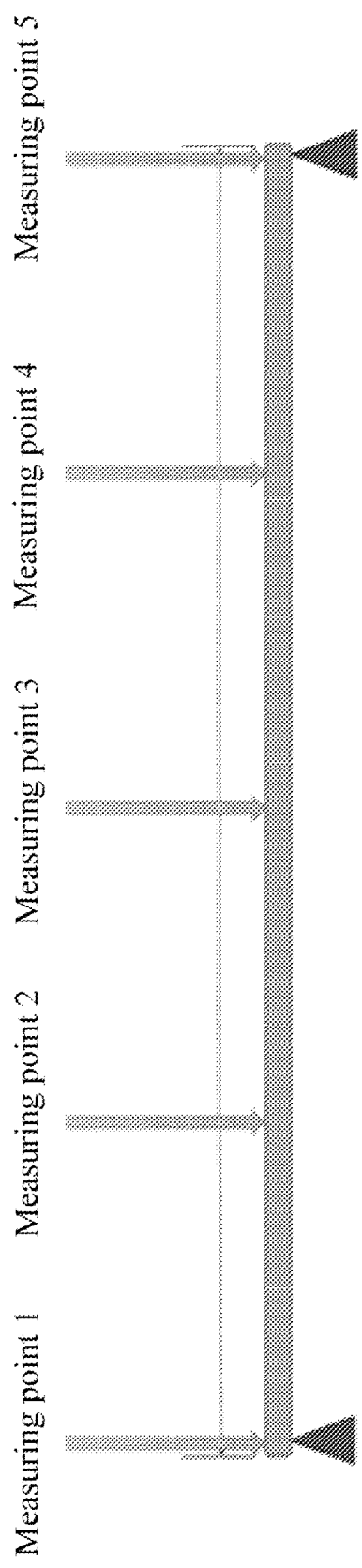
FIG. 5 is a schematic diagram of the layout of targets during the longitudinal mode of vibration test of a simply supported steel beam in the embodiment of the present application.

To further illustrate the above method, the longitudinal mode of vibration testing of a simply supported steel beam as shown in FIG. 5 is taken as an example. The total length of the beam is 6m, and 5 measuring points are arranged equidistantly. Because the measuring point 1 and the measuring point 5 are arranged at the fulcrums, only the data of the measuring point 2, the measuring point 3 and the measuring point 4 are used. The data acquisition frequency of the acquisition system is 59.94 Hz, and the highest recognizable frequency is 29.97 Hz.

Figure 6A:
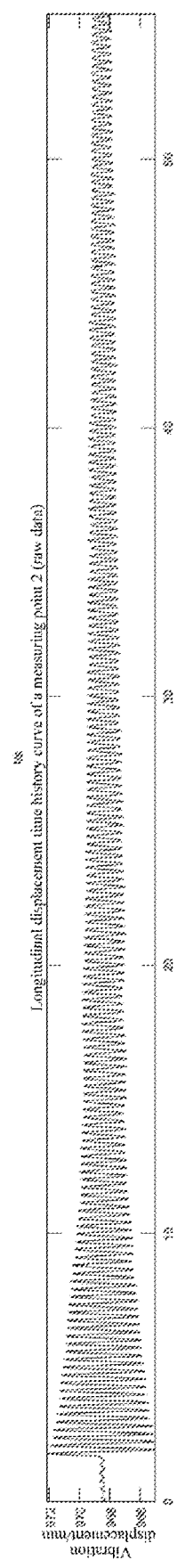
FIG. 6(*a*) is a longitudinal displacement time history curve of a measuring point 2 in the embodiment of the present application.
Figure 6B:
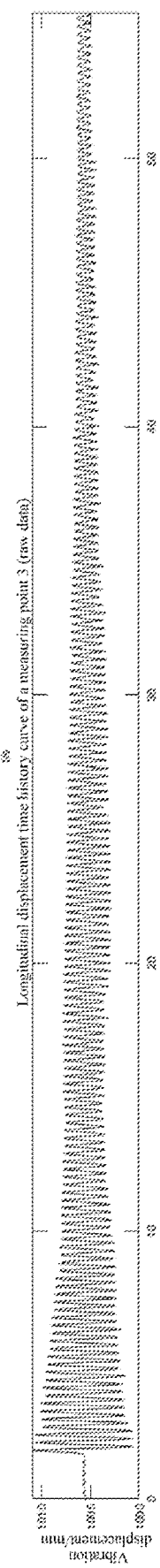
Figure 6C:
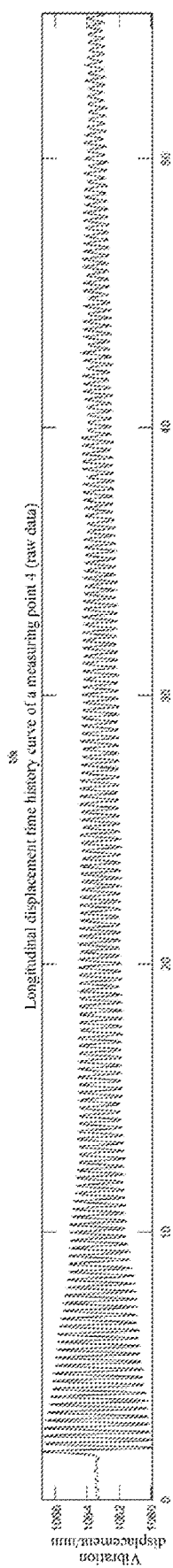
Figure 7:
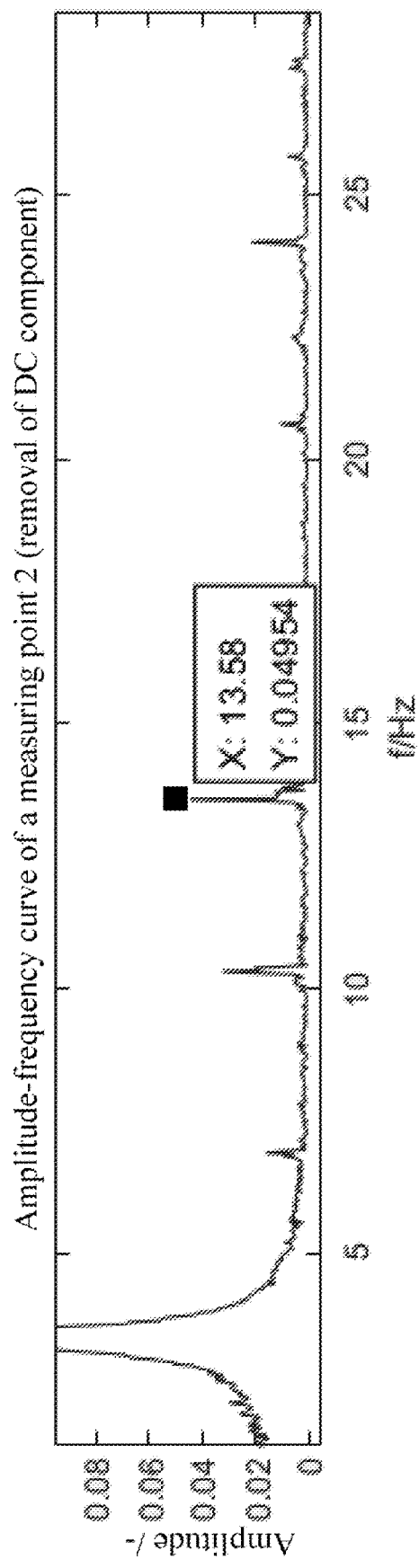
FIG. 7 is a frequency amplitude curve of the measuring point 2 in the embodiment of the present application.
Figure 8:
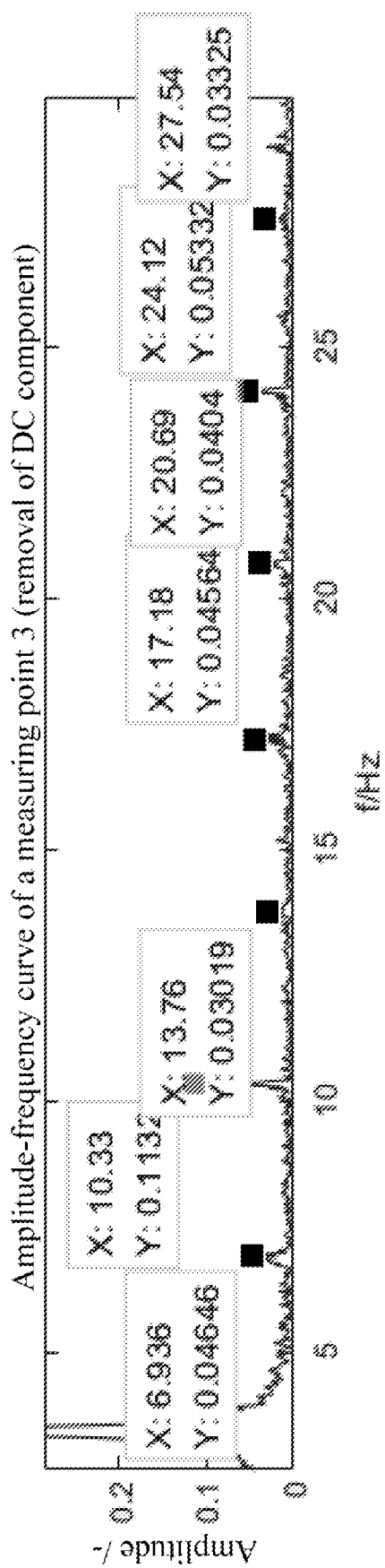
FIG. 8 is a frequency amplitude curve of the measuring point 3 in the embodiment of the present application.
Figure 9:
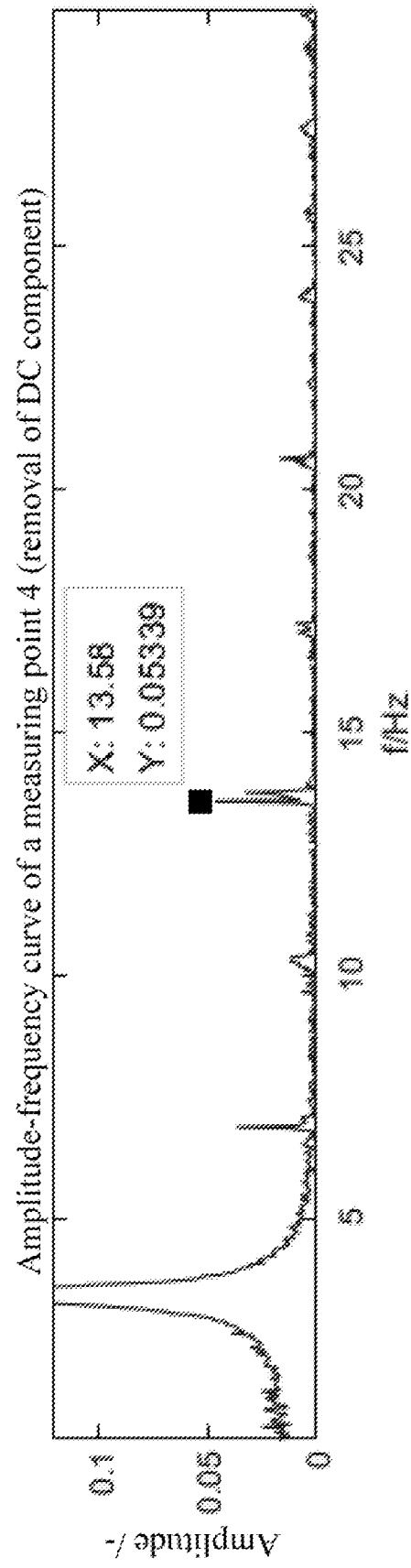
FIG. 9 is a frequency amplitude curve of the measuring point 4 in the embodiment of the present application.
Figure 10A:
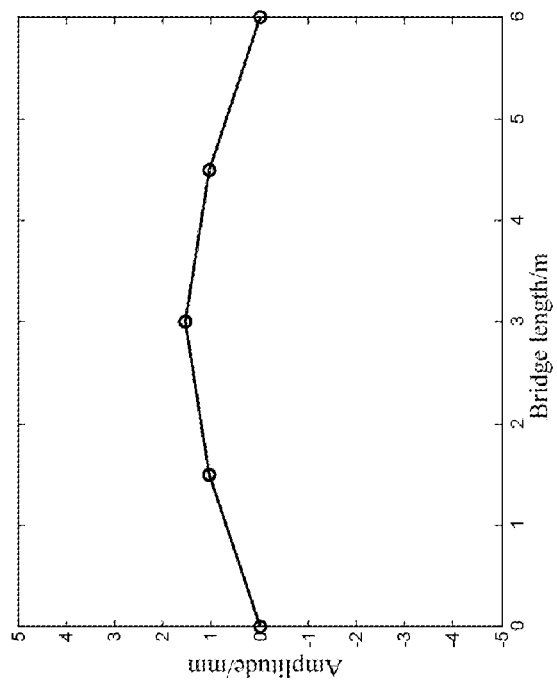
FIG. 10(*a*) is a first-order mode of vibration diagram of a bridge in the embodiment of the present application.
Figure 10B:
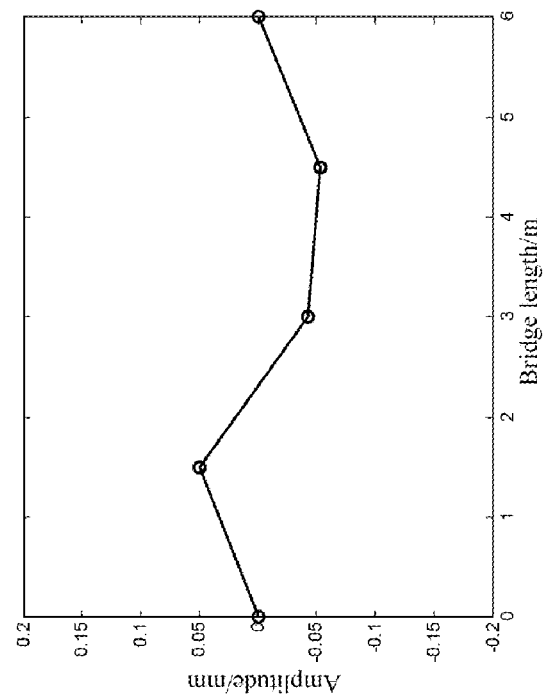
Figure 11A:
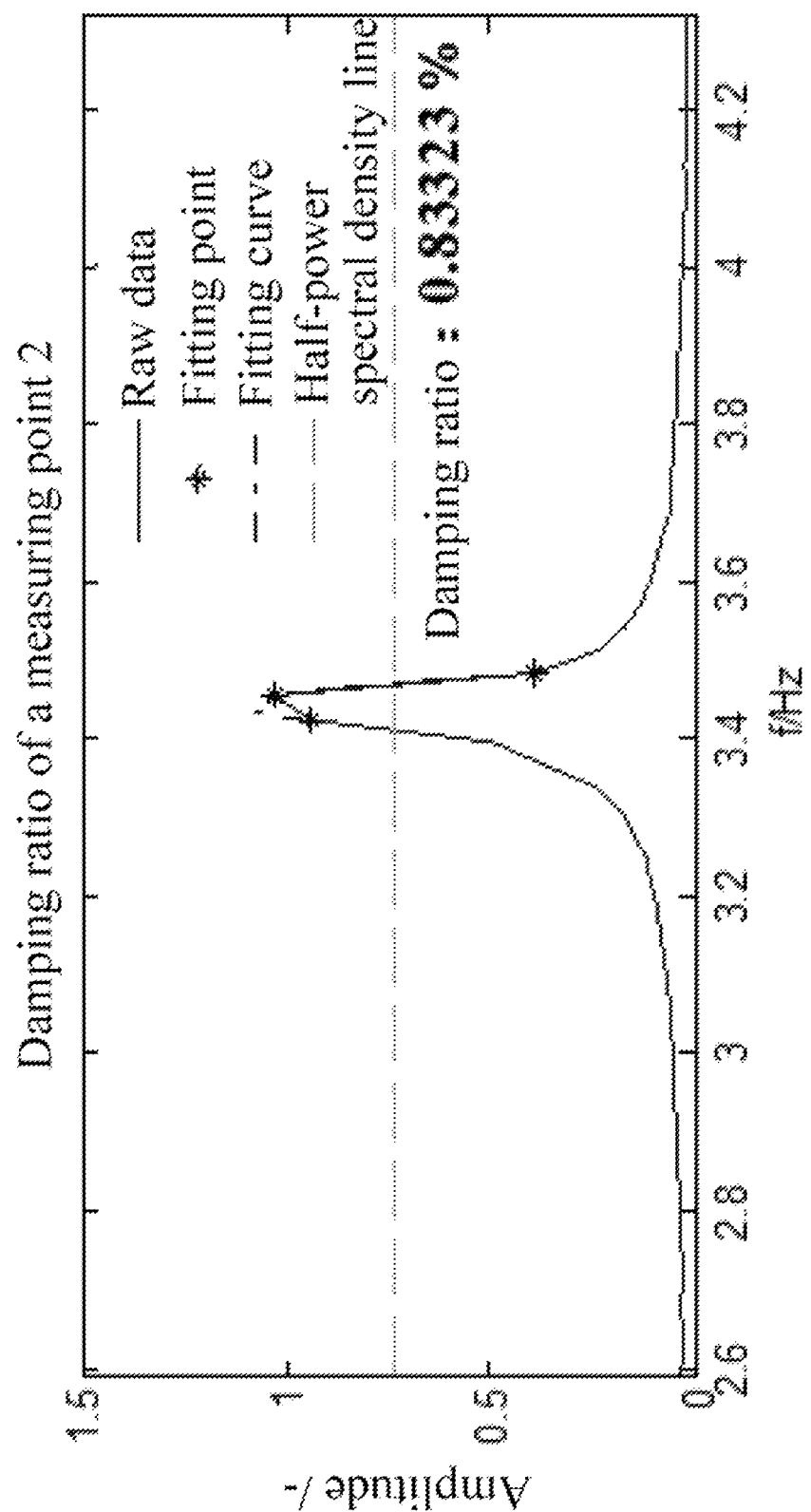
FIG. 11 (*a*) is a damping ratio diagram of the measuring point 2 in the embodiment of the present application.
Figure 11B:
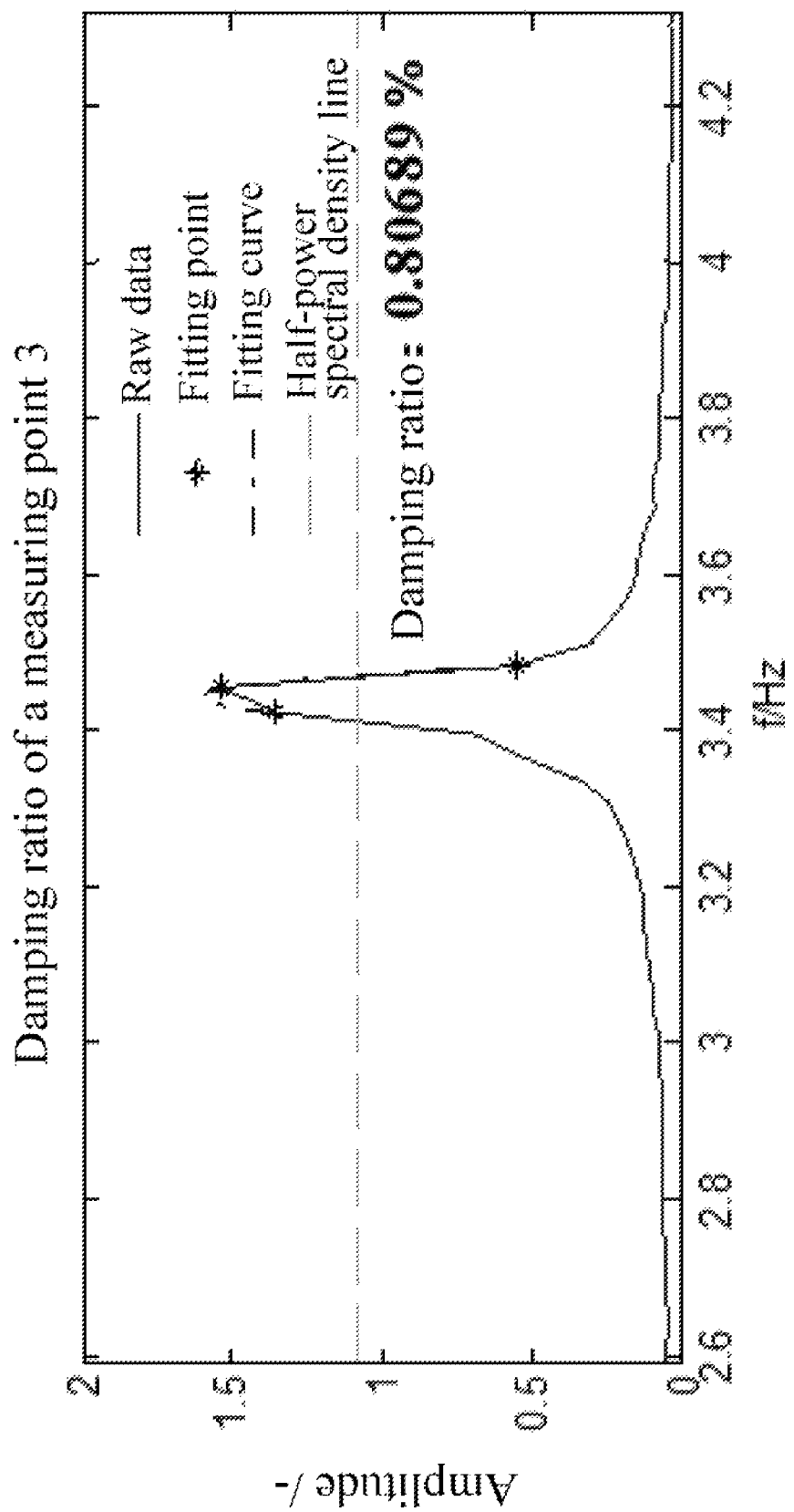
Figure 11C:
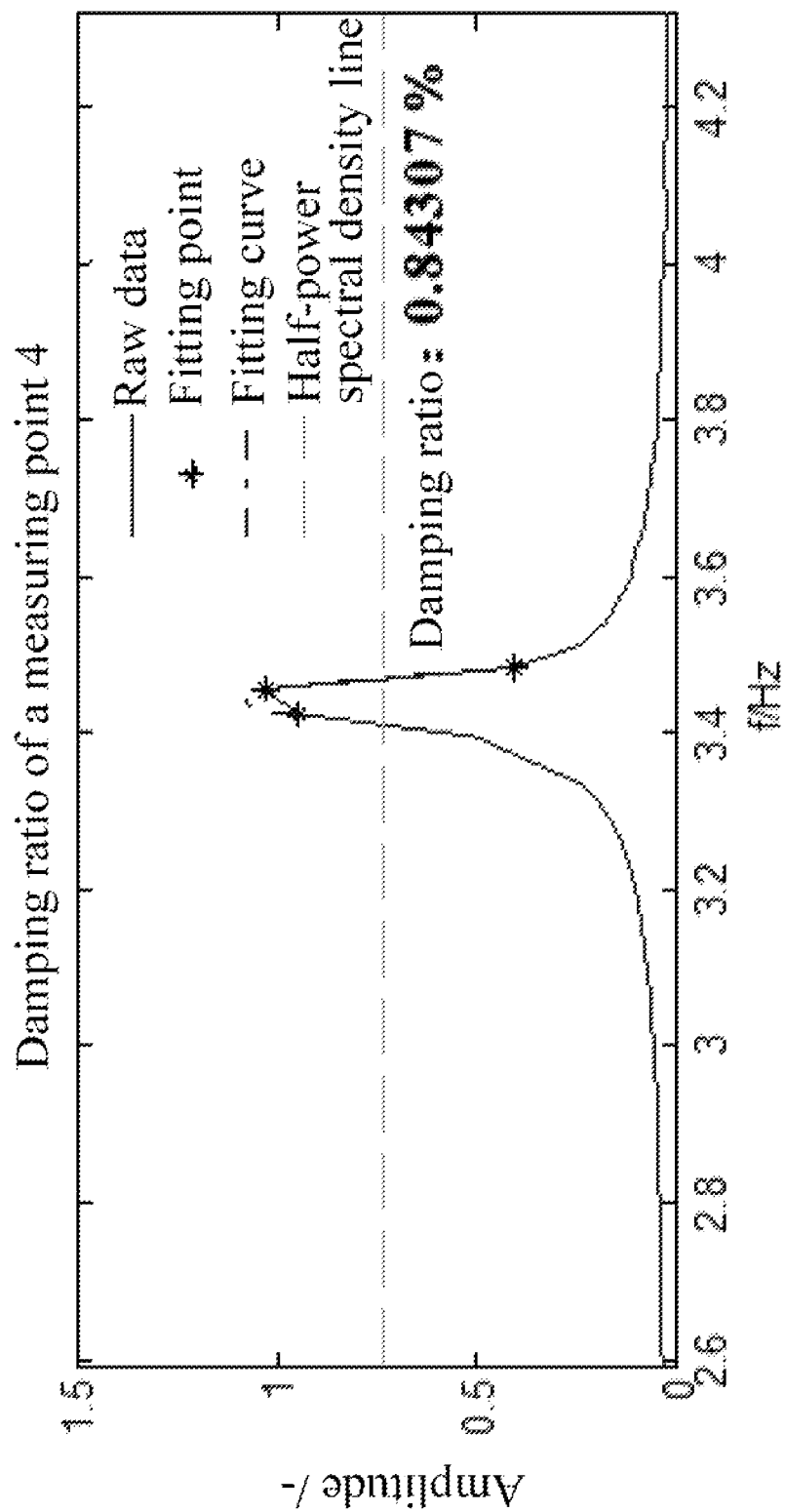

In the present example, the measured longitudinal displacement time history curves of the measuring point 2, the measuring point 3, and the measuring point 4 are shown in FIG. 6(a) to FIG. 6(c), the frequency-amplitude curves of the measuring point 2, the measuring point 3 and the measuring point 4 are shown in FIG. 7~ FIG. 9, and the maximum amplitude of each measuring point along the length of the bridge is shown in FIG. 10(a) and FIG. 10(b). Through the above calculation process of the present application, the damping ratio diagrams of the measuring point 2, the measuring point 3 and the measuring point 4 are shown in FIG. 11(a)~FIG. 11(c). From the results of FIG. 11(a) ~FIG. 11(c), it can be seen that the natural frequency of the simply supported steel beam is about 3.44 Hz. Therefore, the present method can accurately identify the first two-order mode of vibrations of the simply supported beam, which also shows that the principle and operation of the method are feasible. When the acquisition frequency is increased appropriately, the third-order later mode of vibrations can be identified.

In summary, it can be seen that compared with the prior art, the present application has the advantages that the number of sensors required for detection is greatly reduced, and the measurement cost is reduced, the bridge does not need to be equipped with acceleration or displacement sensors, a large amount of wiring work is not required, the bridge deck is not damaged, and the high-precision detection of the lateral (bridge width direction), longitudinal (vertical bridge deck direction) vibration and torsional vibration of the bridge can be realized by laying out once, and the synergy is relatively good.

What is claimed is:

1. A method for testing a structure mode of vibration based on digital image recognition, being performed by a system for testing a structure mode of vibration based on digital image recognition including a camera (1), targets (2), a bridge (3), a vertical acceleration sensor (4) and a lateral acceleration sensor (5), where the camera (1) is arranged near a bridge head of the bridge (3), the bridge is equipped with a plurality of targets (2) equidistantly inside guardrails on both sides, and the vertical acceleration sensor (4) and the lateral acceleration sensor (5) are fixedly arranged on the camera (1), comprising the following process that:

the camera (1) captures images containing all targets (2) in real time, and the vertical acceleration sensor (4) and the lateral acceleration sensor (5) monitor the vibration of the camera (1) itself in real time; and when the bridge (3) is subjected to random excitation to produce vibration, the targets (2) and the camera (1) vibrate together with the bridge (3), and the lateral vibration curve, longitudinal vibration curve and torsional vibration curve of the bridge (3) are calculated by the images containing the targets (2) and the camera (1) vibration information to realize the testing of bridge (3) vibration, wherein the process of calculating the lateral vibration curve, longitudinal vibration curve and torsional vibration curve of the bridge (3) by the images containing the targets (2) and the camera (1) vibration information comprises:

capturing the center of each target (2) from the images containing the targets (2), obtaining the pixel displacements of the target (2) center at different moments, and converting into a unit of length, and then obtaining the lateral relative vibration displacements and longitudinal relative vibration displacements of the measuring points where the targets are located;

unifying the units of the lateral relative vibration displacement and longitudinal relative vibration displacement of each target (2) and the units of the lateral relative vibration displacement and longitudinal vibration displacement unit of the camera (1), and subtracting the reverse displacement caused by camera vibration from the relative vibration displacement of the measuring point to obtain the absolute vibration displacement of the measuring point;

drawing a lateral time history curve and a vertical time history curve of the measuring point corresponding to each target;

using the lateral time history curve and the longitudinal time history curve of the measuring point corresponding to each target to obtain the natural frequency of each order, and obtain the lateral vibration amplitude-frequency characteristics and longitudinal vibration amplitude-frequency characteristics of the bridge (3);

calculating the real-time torsion angle of the measuring point and drawing a time history curve through the longitudinal absolute vibration displacements of measuring points of the two lateral targets (2) in the longitudinal direction of the bridge (3), and obtaining the torsion amplitude-frequency characteristic curve of each measuring point by using the real-time torsion angles and time history curves of all measuring points; and using the obtained torsion amplitude-frequency characteristic curve of each measuring point to obtain the lateral vibration curve, longitudinal vibration curve and torsional vibration curve of the bridge (3).

2. The method for testing the structure mode of vibration based on digital image recognition according to claim 1, performing denoising preprocessing on the absolute vibration displacement data of the measuring point corresponding to each target by filtering, and drawing the lateral time history curve and longitudinal time history curve of the measuring point corresponding to each target.

3. The method for testing the structure mode of vibration based on digital image recognition according to claim 1, performing the fast Fourier transform and spectrum analysis on the lateral time history curve and longitudinal time history curve of the measuring point corresponding to each target to identify the natural frequency of each order, and obtain the lateral vibration amplitude-frequency characteristic and longitudinal vibration amplitude-frequency characteristic of the bridge (3).

4. The method for testing the structure mode of vibration based on digital image recognition according to claim 1, after calculating the real-time torsion angle of the measuring point and drawing the time history curves, performing the fast Fourier transform and frequency spectrum analysis on the time history curves, and performing the same processing on the data of the measuring points corresponding to all targets to obtain the torsional amplitude-frequency characteristic curve of each measuring point.

5. The method for testing the structure mode of vibration based on digital image recognition according to claim 1, using the obtained amplitude-frequency characteristic curve of each measuring point, calculating the damping coefficient based on a half-power spectral density method, calculating the impact coefficient of the bridge by a weighting method, and drawing the lateral vibration curve, longitudinal vibration curve and torsional vibration curve of the bridge (3).

* * * * *